United States Patent [19]

Simons

[11] Patent Number: 5,632,557
[45] Date of Patent: May 27, 1997

[54] MODULAR TEMPERATURE SENSING APPARATUS

[75] Inventor: Robert A. Simons, Austin, Tex.

[73] Assignee: Weed Instrument Company, Inc., Round Rock, Tex.

[21] Appl. No.: 358,787

[22] Filed: Dec. 16, 1994

[51] Int. Cl.[6] .............................. G01K 13/02; G01K 1/08; G01K 1/14
[52] U.S. Cl. .............................................. 374/148; 374/208
[58] Field of Search ........................... 374/148, 208, 374/140

[56] References Cited

U.S. PATENT DOCUMENTS

| | | | |
|---|---|---|---|
| 2,839,594 | 6/1958 | Schneidersmann | 374/208 |
| 3,188,866 | 6/1965 | Mayer | 374/148 |
| 3,530,716 | 9/1970 | Truppe et al. | 374/140 |
| 3,647,559 | 3/1972 | Truppe et al. | 374/140 |
| 3,774,136 | 11/1973 | Zelenka . | |
| 3,774,138 | 11/1973 | Zelenka . | |
| 3,784,947 | 1/1974 | Zelenka . | |
| 4,008,614 | 2/1977 | Turner et al. . | |
| 4,137,768 | 2/1979 | Tushie et al. . | |
| 4,137,771 | 2/1979 | Young et al. . | |
| 4,324,945 | 4/1982 | Sivyer | 374/148 |
| 4,355,912 | 10/1982 | Haak | 374/208 |
| 4,453,835 | 6/1984 | Clawson et al. | 374/208 |
| 4,626,643 | 12/1986 | Minet | 374/208 |
| 4,962,765 | 10/1990 | Kung et al. . | |
| 5,088,835 | 2/1992 | Shigezawa et al. | 374/181 |
| 5,174,303 | 12/1992 | Schroeppel | 128/786 |

FOREIGN PATENT DOCUMENTS

| | | | |
|---|---|---|---|
| 0052369 | 5/1982 | European Pat. Off. | 374/208 |
| 0149928 | 9/1982 | Japan | 374/148 |

OTHER PUBLICATIONS

Figs. 1 and 2 of GB 1,334,550 published in Oct. 1973.

Primary Examiner—Diego F. F. Gutierrez
Attorney, Agent, or Firm—Shaffer & Culbertson; Russell D. Culbertson

[57] ABSTRACT

A temperature sensing device (30) includes a temperature sensor (36) in a sensor position within a sensor receiving opening (42) in an elongated sheath (32). An elongated sensor positioning member (38) and a sensor securing arrangement (50) work in unison to releasably fix the temperature sensor (36) in the sensor position at a closed end of the elongated sheath (32). An attachment structure attaches the elongated sheath (32) to a structure (29) such that a closed end (46) of the sheath extends into a medium to be sensed. Preferably, the securing arrangement (50) includes a lug (54) extending from the elongated sheath (32) at an open end (44) of the sheath. An attachment piece (58), slidably attached to the elongated sensor positioning member (38) engages the lug (54) and a biasing spring (60) biases the elongated sensor positioning member (38) away an end of the sensor positioning member (38) opposite the end upon which the attachment piece (58) is mounted so as to force the temperature sensor (36) against the closed end (46) of the elongated sheath (32).

9 Claims, 3 Drawing Sheets

MODULAR TEMPERATURE SENSING APPARATUS

BACKGROUND OF THE INVENTION

This invention relates to temperature sensing devices. More particularly, the invention relates to a temperature sensing device in which the temperature sensing element may be replaced separately from the surrounding structure.

Many industrial processes require that the temperatures of the material being processed be monitored closely at various points. For example, it may be necessary or desirable to obtain temperature readings of a substance contained within a reaction vessel or flowing through a conduit. Temperature readings from within a vessel or conduit may be obtained from a temperature sensing device positioned in a thermowell structure extending into the conduit or vessel from a conduit or vessel wall. As shown in FIG. 1, a traditional thermowell structure 10 comprises a base or mounting detail 12 which could be fixed within a conduit or vessel wall 14 and a closed-ended sheath 16 extending a desired distance into the conduit or vessel. The temperature sensing device 18 used with the thermowell included an elongated probe 20 with a sensing element 22 sealed in the end 24 which was inserted into the thermowell sheath to the desired position. Leads 26 from the sensing element carry temperature data signals from the sensing element to suitable signal processing and control equipment.

The structure shown in FIG. 1 provided the benefit of allowing the temperature sensing device 18 to be replaced without disrupting the process being monitored. A drawback of the thermowell and separate temperature sensing device, however, related to the separate and replaceable nature of the temperature sensing device as well. The temperature sensor element within the temperature sensing device was separated from the medium to be sensed by both the sheath wall of the thermowell and the probe wall of the temperature sensing device itself. Even though the materials used for the thermowell sheath wall and temperature sensor probe wall had good thermal conductivity properties, the mass necessarily associated with the two separate walls of material caused the sensor element to respond slowly to temperature changes in the medium being sensed.

Alternatively to using a thermowell and separate temperature sensor, a "direct immersion" temperature sensing device may be fixed in the wall or a vessel or conduit with an elongated probe extending into the vessel or conduit. As compared to the thermowell and separate sensing device shown in FIG. 1, this direct immersion type sensing device eliminated one layer of material between the sensor element and the medium being sensed. The reduced mass of the direct immersion type sensing device allowed the device to respond more quickly to temperature changes and thus provided more accurate temperature readings. However, replacing a failed direct immersion type sensing device required that the process being monitored be completely shut down and the vessel or conduit opened when the failed device was removed. This interruption of the process being monitored was always time-consuming and expensive and was even impossible in some circumstances.

Another problem with both direct immersion sensors and thermowell temperature sensing arrangements related to the number of different sizes of temperature sensing devices required for monitoring a given process. Both the direct immersion sensors and the thermowell arrangements shown in FIG. 1 are of varying lengths depending upon the particular application. For example, thermowells mounted upon relatively small conduits are usually shorter than thermowells mounted on relatively larger conduits. Each length of thermowell required a correspondingly length temperature sensing device. At least one replacement sensing device was usually stocked for each length of thermowell resulting in high inventory costs. The same sort of inventory was required for direct immersion sensors.

SUMMARY OF THE INVENTION

It is a general object of the invention to overcome the above described limitations and others associated with prior temperature sensing devices. More particularly, it is an object of the invention to provide a temperature sensing apparatus with superior thermal sensing characteristics and a sensing element that may be removed and replaced quickly and easily without interfering with the process being sensed.

To accomplish these objects, a temperature sensing apparatus according to the present invention includes a separate temperature sensor and a structure for positioning and securing the temperature sensor in a thermowell. The thermowell includes a sheath and a mounting structure for mounting the sheath in a position in which the closed end of the sheath extends into a medium to be sensed and with an open end of the sheath isolated from the medium being sensed. The positioning and securing structure itself connects to the thermowell sheath or structure associated with the sheath but is releasable from the thermowell. Releasing the positioning and securing structure allows the separate temperature sensor to be removed from the thermowell and replaced as necessary.

The positioning and securing structure according to the invention includes an elongated temperature sensor positioning member and sensor securing means associated with the sensor positioning member. The sensor securing means connects the sensor positioning member to the thermowell sheath in an operating position extending within the sheath. When in the operating position the sensor positioning member retains the temperature sensor in a sensing position in the sheath. Thus the length of the positioning member is related the length of the sheath such that a fixed length temperature sensor may be used in different sheaths of various lengths. Also, in one form of the invention, the sensor securing means also operates to apply a positioning force from the sensor positioning member to the temperature sensor and this positioning force holds the sensor in good heat conductive relationship with the closed end of the thermowell sheath.

In the preferred form of the invention the sensor securing means includes an attachment piece slidably mounted on one end of the elongated sensor positioning member. A biasing spring is also mounted on the positioning member and acts between the sensor positioning member and the attachment piece to bias the attachment piece away from the opposite end of the positioning member. The attachment piece also includes a J-slot arrangement adapted to receive a lug associated with the sheath. With the positioning member inserted into the sheath until the lug is received in the hook of the J-slot, the biasing spring applies a force to the positioning member which presses the separate temperature sensor against the end of the thermowell sheath.

The temperature sensor apparatus according to the invention provides several advantages. Separating the temperature sensor from the structure used to position the sensor in the sheath allows the mass surrounding the sensor element to be reduced which increases the sensitivity of the sensor device to temperature changes in the medium being sensed. Also, separating the temperature sensor from the sensor positioning structure allows a single temperature sensor size to be used with any length of sheath. Thus, only a single replacement temperature sensor type must be stocked, the single sensor size fitting every length of the temperature sensing apparatus. Only the length of the positioning and securing structure changes between different thermowell sheath lengths. The positioning structure, which is not subject to failure as is the temperature sensor itself, need not be replaced with the failed temperature sensor and may be used repeatedly with different temperature sensors.

These and other objects, advantages, and features of the invention will be apparent from the following description of the preferred embodiments, considered along with the accompanying drawings.

DESCRIPTION OF THE PREFERRED EMBODIMENTS

Figure 1:
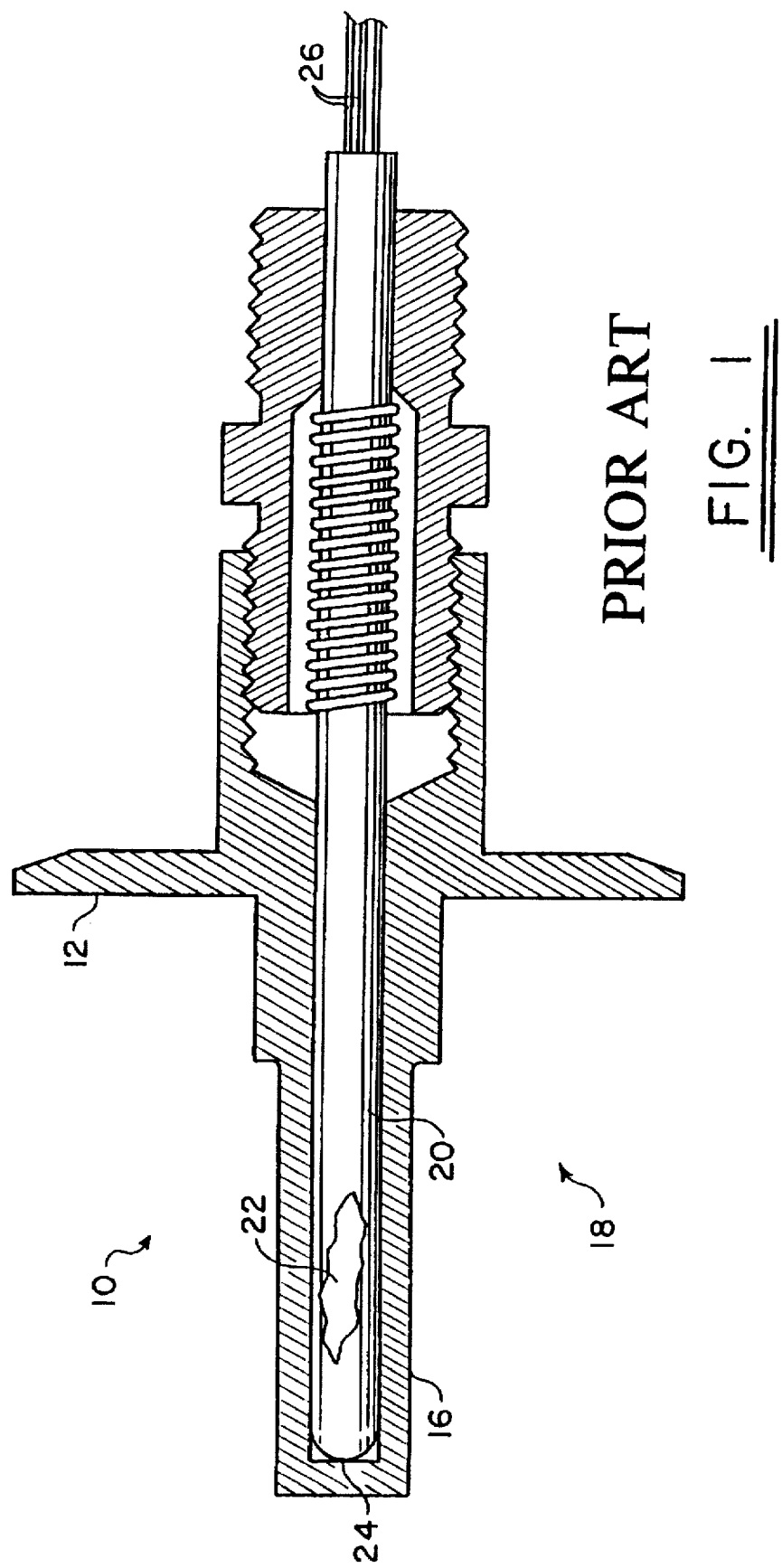
FIG. 1 is a view in longitudinal section of a prior art temperature sensing apparatus.
Figure 2:
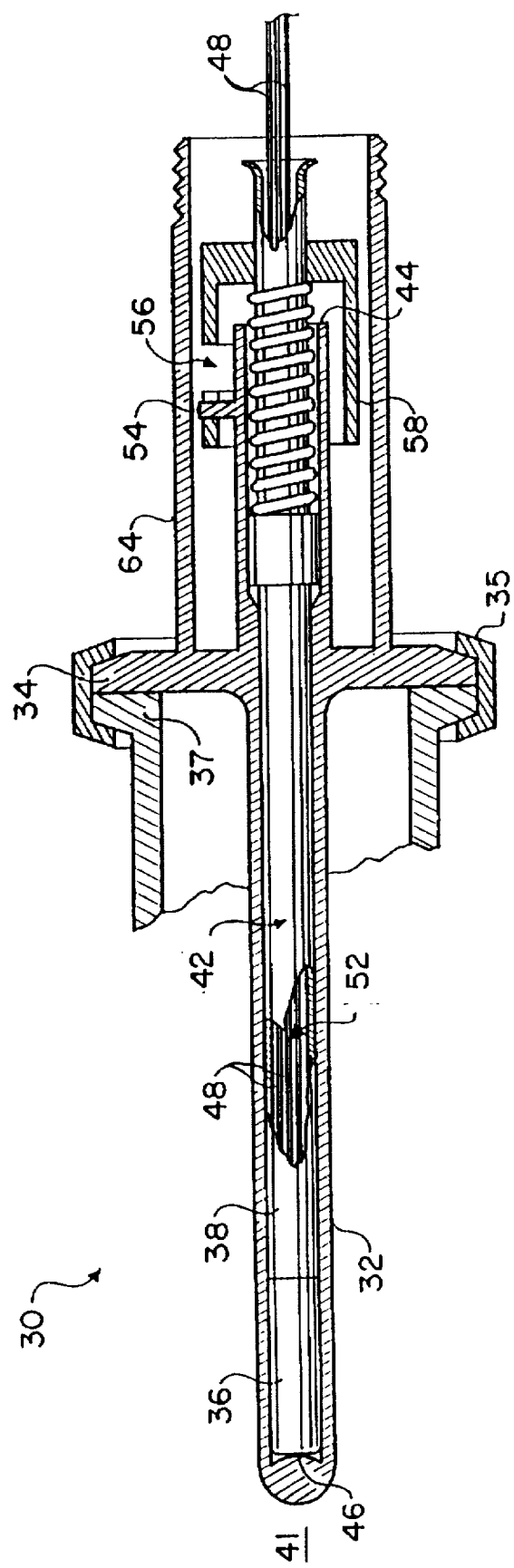
FIG. 2 is a view in partial longitudinal section showing a temperature sensing device according to the invention in a fully installed position.
Figure 3:
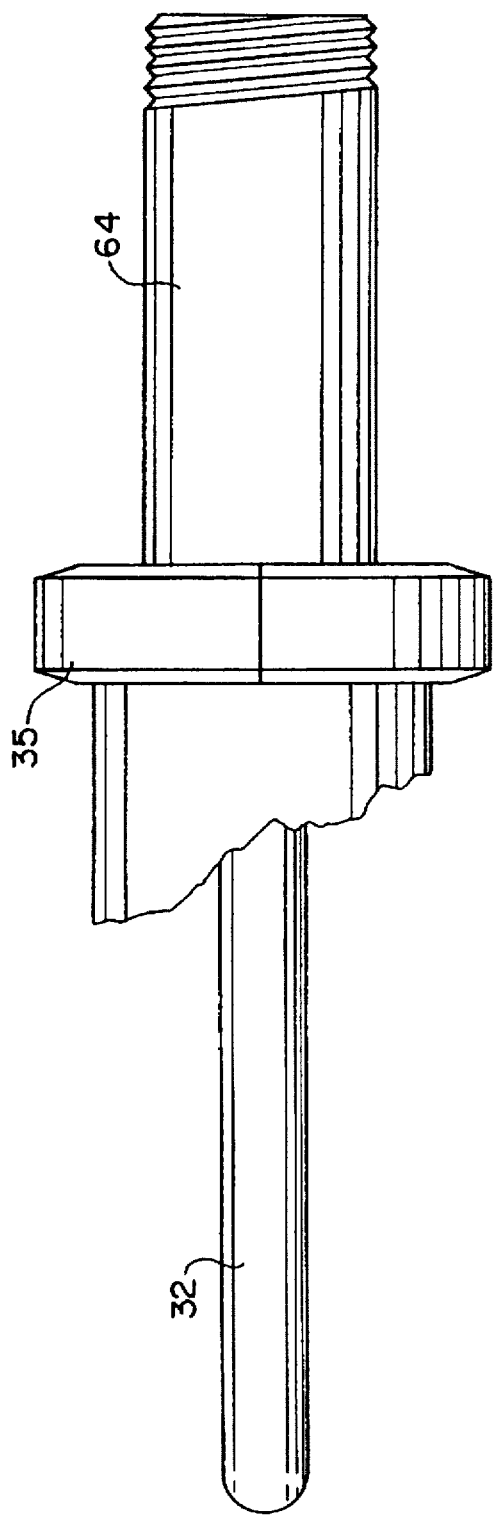
FIG. 3 is an exploded view in side elevation of the temperature sensing device shown in FIG. 2.
Figure 3:
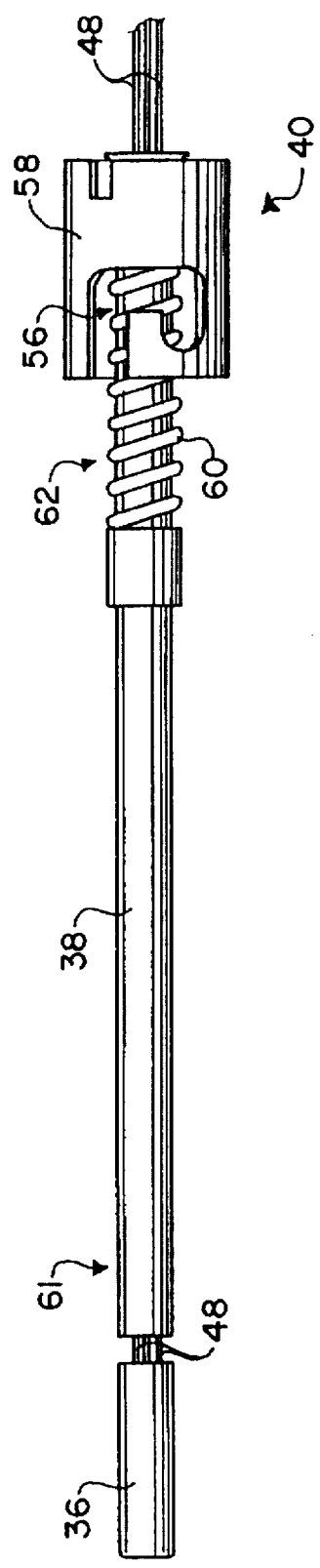

A temperature sensing apparatus 30 embodying the principles of the present invention is shown by way of illustration in FIGS. 2 and 3. Referring to FIG. 2, the temperature sensing apparatus 30 includes a thermowell structure having an elongated sheath 32 and attachment means 34. The apparatus 30 also includes a temperature sensor 36, an elongated sensor positioning member 38, and sensor securing means 40.

Preferably, the elongated sheath 32 and attachment means 34 are welded together to form a single block of material such as stainless steel. The attachment means 34 may be attached with a suitable connector 35 to a structure such as a conduit fitting 37 such that a portion of the elongated sheath 32 extends into a medium to be sensed 41. The elongated sheath 32 includes a sensor receiving opening 42 which extends longitudinally therethrough from an open end 44 to a closed end 46. The sensor receiving opening 42 and the temperature sensor 36 are sized such that the temperature sensor has a slightly smaller diameter than the opening so that the sensor may slide within the opening with minimal clearance and be positioned in a sensor position in the sheath 32. When in the sensor position the temperature sensor 36 physically contacts the surface of the elongated sheath 32 at the closed end 46. This contact provides a good thermal path for conducting heat from the medium being sensed to the temperature sensor 36.

The temperature sensor 36 includes sensor leads 48 which extend from the sensor 36 in the sensor position out of the sheath open end 44 through the sensor receiving opening 42. Preferably, the sensor leads 48 comprise a plurality of wires which carry temperature signals from a sensor element (not shown) in the temperature sensor 36 to an external system (not shown). However, as one skilled in the art will readily appreciate, the manner of communication between the temperature sensor 36 and external system could be by optical means, radio transmission, or any other means of communication.

As shown in FIG. 2, the elongated sensor positioning member 38 is adapted to reside in an operating position in which it extends through the sensor receiving opening 42 of the sheath 32 from the temperature sensor 36 in the sensor position to the sheath open end 44. As shown in FIG. 3, the sensor positioning member 38 is separable from the temperature sensor 36 so that it may be separated from the sensor without damaging the functionality of the temperature sensor. Preferably, the sensor positioning member 38 includes an opening 52 extending longitudinally therethrough and the temperature sensor leads 48 extend through the opening.

The sensor securing means 40 is associated with the sensor positioning member 38 to releasably fix the sensor positioning member in the operating position. The sensor securing means 40 allows the sensor positioning member 38 to be released from the operating position so that the sensor positioning member and the temperature sensor 36 may be withdrawn from the sheath 32. In this manner, a failed temperature sensor 36 may be readily replaced.

Replacing a temperature sensor according to the invention is accomplished by disconnecting the sensor securing means and withdrawing the failed temperature sensor 36, sensor positioning member 38 from the elongated sheath 32. After withdrawing the sensor 36 and positioning member 38, replacing the sensor includes separating the failed temperature sensor from the sensor positioning member. A new sensor 36 may then be joined to the sensor positioning member 38 by inserting the sensor leads 48 through the opening 52. The replacement is completed by inserting the new temperature sensor 36 and sensor positioning member 38 into the sheath opening 42 and then securing the positioning member in place with the securing means.

Preferably, the sensor securing means 40 operates to apply a positioning force to the elongated sensor positioning member 38. The elongated sensor positioning member 38, in turn, transfers the positioning force to the temperature sensor 36 so as to force the temperature sensor against the closed end 46 of the sheath 32. The positioning force enhances the heat transfer characteristics between the elongated sheath 32 and temperature sensor 36 thus increases the performance of the apparatus 30.

In a preferred construction, the sensor securing means 40 includes an attachment feature 54, an engaging feature 56, an attachment piece 58, and biasing means 60. Preferably, the attachment feature 54 comprises a lug that is connected to the elongated sheath 32 near its open end 44. The preferred engaging feature 56 comprises a J-slot formed in the attachment piece 58. The attachment piece 58 is slidably mounted on the elongated sensor positioning member 38 so that it may move relative to the attachment feature 54 when the positioning member 38 is stationary in the operating position shown in FIG. 2. Referring to FIG. 3, the biasing means 60 biases the attachment piece 58 away from an end 61 of the sensor positioning member 38 that is opposite the first end 62 upon which the attachment piece 58 is mounted.

The present invention also includes a tubular shield 64 connected to the elongated sheath 32 in position to protect the open end 44 of elongated sheath. The tubular shield 64 works to protect the components of the temperature sensing apparatus 30 from the environment as well as from physical contact.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A temperature sensing apparatus comprising:

(a) an elongated sheath having a sensor receiving opening extending longitudinally therethrough from an open end to a closed end;

(b) attachment means connected to the sheath for securing the sheath to a structure with the closed end of the sheath extending into a medium to be sensed;

(c) a temperature sensor in a sensor position at the closed end of the sheath, the temperature sensor being adapted to be inserted into the sheath open end and through the length of the sensor receiving opening to the sensor position, and having a plurality of sensor leads connected thereto;

(d) a rigid, elongated sensor positioning member having a cross-sectional shape enabling a first end thereof to be inserted into the sheath open end to an operating position in which the sensor positioning member extends through the sensor receiving opening of the sheath from the temperature sensor in the sensor position to the sheath open end, the sensor positioning member being readily separable from the temperature sensor and, when in the operating position, leaving a continuous and open lead receiving area from the temperature sensor to the sheath open end and within the area defined by the sensor receiving opening of the sheath, the sensor leads extending through the lead receiving area from the temperature sensor to a point beyond the open end of the sheath; and (e) sensor securing means associated with the sensor positioning member for securing the sensor positioning member in the operating position with a sensor positioning force pressing the sensor positioning member against the temperature sensor in the sensor position.

2. The temperature sensing apparatus of claim 1 wherein an attachment feature is associated with the elongated sheath near the open end of the elongated sheath and the sensor securing means comprises:

(a) an attachment piece slidably mounted on a first end of the elongated sensor positioning member and including an engaging feature for releasably engaging the attachment feature so as to secure the sensor positioning member in the operating position; and (b) biasing means for biasing the attachment piece away from an end of the sensor positioning member opposite the first end thereof.

3. The temperature sensing apparatus of claim 2 wherein:

(a) the attachment feature comprises a lug extending radially from an outer surface of the elongated sheath; and (b) the attachment piece includes a J-slot for receiving the lug.

4. The temperature sensing apparatus of claim 1 wherein the elongated sensor positioning member includes an opening extending longitudinally therethrough and the leads extend through the opening.

5. The temperature sensing apparatus of claim 1 further comprising a shield structure connected to the sheath in position to cover and protect the open end of the sheath.

6. An apparatus for positioning a temperature sensor in a sensor position at a closed end of a thermowell, the thermowell having a sensor receiving opening extending longitudinally therethrough from an open end to the closed end, the apparatus comprising:

(a) a rigid, elongated sensor positioning member having a cross-sectional shape enabling a first end of the sensor positioning member to be inserted through the open end of the thermowell and into the sensor receiving opening to an operating position in which the elongated sensor positioning member contacts the temperature sensor in the sensor position in the thermowell, the elongated sensor positioning member being readily separable from the temperature sensor and, when in the operating position, leaving a continuous and open lead receiving area from the temperature sensor to the sheath open end and within the area defined by the sensor receiving opening of the thermowell, the sensor leads extending through the lead receiving area from the temperature sensor to a point beyond the open end of the thermowell; and (b) sensor securing means associated with the sensor positioning member for releasably securing the sensor positioning member in the operating position.

7. The temperature sensing apparatus of claim 6 wherein an attachment feature is fixed on the elongated thermowell near the open end thereof and the sensor securing means comprises:

(a) an attachment piece slidably mounted on the elongated sensor positioning member and including an engaging feature for releasably engaging the attachment feature; and (b) biasing means for biasing the attachment piece away from an end of the sensor positioning member opposite the first end thereof.

8. The temperature sensing apparatus of claim 7 wherein:

(a) the attachment feature comprises a lug extending radially from an outer surface of the elongated sheath; and (b) the attachment piece includes a J-slot for receiving the lug.

9. The temperature sensing apparatus of claim 6 wherein the sensor elongated sensor positioning member includes an opening extending longitudinally therethrough and through which leads associated with the temperature sensor may extend.

* * * * *

UNITED STATES PATENT AND TRADEMARK OFFICE
CERTIFICATE OF CORRECTION

PATENT NO. : 5,632,557
DATED : May 27, 1997
INVENTOR(S) : Robert A. Simons It is certified that error appears in the above-identified patent and that said Letters Patent is hereby corrected as shown below:

Column 6, Line 22, please delete the word "sheath" and insert in its place --thermowell--.

Column 6, Line 45, please delete the word "sheath" and insert in its place --thermowell--.

Column 6, Line 50, please delete the word "sensor" the first time it appears in the line.

Signed and Sealed this

Twenty-sixth Day of August, 1997

*Attest:*

BRUCE LEHMAN

*Attesting Officer*            *Commissioner of Patents and Trademarks*